(12) United States Patent
Nutaro et al.

(10) Patent No.: US 9,074,891 B2
(45) Date of Patent: Jul. 7, 2015

(54) HIGH INTEGRITY, SURFACE GUIDANCE SYSTEM FOR AIRCRAFT ELECTRIC TAXI

(71) Applicant: HONEYWELL INTERNATIONAL INC., Morristown, NJ (US)

(72) Inventors: Joseph Nutaro, Phoenix, AZ (US);
Keith Hughes, Peoria, AZ (US);
Christine Marie Haissig, Chanhassen, MN (US); Daniel Eugene Lewis, Glendale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 481 days.

(21) Appl. No.: 13/655,407

(22) Filed: Oct. 18, 2012

(65) Prior Publication Data

US 2014/0114557 A1 Apr. 24, 2014

(51) Int. Cl.
*G06F 19/00* (2011.01)
*G06G 7/70* (2006.01)
*G06G 7/76* (2006.01)
*G01C 21/00* (2006.01)

(52) U.S. Cl.
CPC ..................................... *G01C 21/00* (2013.01)

(58) Field of Classification Search
CPC ... G05D 1/0083; G05D 1/0202; G08G 5/065; G08G 5/0021; G08G 5/0013
USPC ......................................... 701/120, 121, 122
See application file for complete search history.

(56) References Cited

U.S. PATENT DOCUMENTS

| | | |
|---|---|---|
| 3,706,969 A | 12/1972 | Paredes |
| 3,807,664 A | 4/1974 | Kelly, Jr. et al. |
| 4,659,039 A | 4/1987 | Valdes |
| 5,078,340 A | 1/1992 | Anderberg |
| 6,411,890 B1 | 6/2002 | Zimmerman |
| 6,553,307 B2 | 4/2003 | Stratton et al. |
| 6,571,166 B1 | 5/2003 | Johnson et al. |
| 6,731,226 B2 | 5/2004 | Walter |
| 6,751,545 B2 | 6/2004 | Walter |
| 6,945,354 B2 | 9/2005 | Goff |
| 7,039,518 B2 | 5/2006 | Ingram et al. |
| 7,148,814 B2 | 12/2006 | Sikora et al. |
| 7,222,017 B2 | 5/2007 | Clark et al. |
| 7,226,018 B2 | 6/2007 | Sullivan |

(Continued)

FOREIGN PATENT DOCUMENTS

| | | |
|---|---|---|
| GB | 2471213 A | 12/2010 |
| WO | 2007027588 A1 | 3/2007 |

OTHER PUBLICATIONS

USPTO Office Action for U.S. Appl. No. 13/223,461 dated Apr. 17, 2014.

(Continued)

*Primary Examiner* — Calvin Cheung
*Assistant Examiner* — Paula L Schneider
(74) *Attorney, Agent, or Firm* — Ingrassia Fisher & Lorenz, P.C.

(57) ABSTRACT

A high-integrity auto-guidance and control method for use in conjunction with an aircraft electric taxi drive system comprises obtaining taxi path data generating in a plurality of processors taxi path guidance and control information from the taxi path guidance data, and sending commands derived from the taxi path guidance and control information from one of the plurality of processors based on a predetermined priority scheme to at least one electric taxi controller.

18 Claims, 9 Drawing Sheets

(56) References Cited

U.S. PATENT DOCUMENTS

| | | | |
|---|---|---|---|
| 7,237,748 | B2 | 7/2007 | Sullivan |
| 7,382,284 | B1 | 6/2008 | Armstrong et al. |
| 7,445,178 | B2 | 11/2008 | McCoskey et al. |
| 7,564,372 | B1 | 7/2009 | Bailey et al. |
| 7,592,929 | B2 | 9/2009 | Pepitone |
| 7,594,626 | B2 | 9/2009 | Soderberg |
| 7,703,717 | B2 | 4/2010 | Soderberg |
| 7,731,122 | B2 | 6/2010 | Frank |
| 7,737,867 | B2 | 6/2010 | Arthur et al. |
| 7,813,845 | B2 | 10/2010 | Doose et al. |
| 7,817,065 | B2 | 10/2010 | Fetzmann et al. |
| 7,974,773 | B1 | 7/2011 | Krenz et al. |
| 7,975,959 | B2 | 7/2011 | Perry et al. |
| 7,975,960 | B2 | 7/2011 | Cox et al. |
| 7,983,804 | B2 | 7/2011 | Cox et al. |
| 8,024,078 | B2 | 9/2011 | Coulmeau et al. |
| 8,140,257 | B2 | 3/2012 | Villaume et al. |
| 8,403,259 | B2 | 3/2013 | Charuel et al. |
| 2003/0102987 | A1 | 6/2003 | Walter |
| 2004/0059497 | A1* | 3/2004 | Sankrithi ............... 701/120 |
| 2006/0065779 | A1 | 3/2006 | McCoskey et al. |
| 2007/0158497 | A1 | 7/2007 | Edelson et al. |
| 2007/0282491 | A1 | 12/2007 | Cox et al. |
| 2008/0109163 | A1 | 5/2008 | Stone et al. |
| 2008/0179146 | A1 | 7/2008 | Sullivan |
| 2008/0191903 | A1 | 8/2008 | Doubourg et al. |
| 2009/0045982 | A1 | 2/2009 | Caillaud et al. |
| 2009/0150008 | A1 | 6/2009 | Villaume et al. |
| 2009/0218440 | A1 | 9/2009 | Dilmaghani et al. |
| 2009/0261197 | A1* | 10/2009 | Cox et al. ............... 244/50 |
| 2010/0006699 | A1 | 1/2010 | Sullivan |
| 2010/0063716 | A1 | 3/2010 | Brozat |
| 2010/0114491 | A1 | 5/2010 | Maily |
| 2010/0114922 | A1 | 5/2010 | Gayraud et al. |
| 2010/0198489 | A1 | 8/2010 | Rozovski et al. |
| 2010/0204909 | A1 | 8/2010 | Gayraud et al. |
| 2010/0241291 | A1* | 9/2010 | Konya ............... 701/3 |
| 2011/0046868 | A1 | 2/2011 | Michel et al. |
| 2011/0133545 | A1 | 6/2011 | Pearson et al. |
| 2011/0198439 | A1 | 8/2011 | Rotger et al. |
| 2011/0233328 | A1 | 9/2011 | Alleau et al. |
| 2011/0290933 | A1 | 12/2011 | Cros et al. |
| 2011/0297786 | A1 | 12/2011 | Sweet et al. |
| 2011/0313597 | A1 | 12/2011 | Wilson et al. |
| 2011/0313645 | A1 | 12/2011 | Shukla |
| 2013/0057414 | A1 | 3/2013 | Nutaro et al. |
| 2013/0131888 | A1 | 5/2013 | Nutaro et al. |

OTHER PUBLICATIONS

USPTO Office Action for U.S. Appl. No. 13/463,657 dated Jun. 4, 2013.
EP Office Action dated Sep. 6, 2013 for application No. 13 163 438.8.
USPTO Corrected Notice of Allowability for U.S. Appl. No. 13/463,657 dated Oct. 8, 2013.
USPTO Supplemental Notice of Allowability for U.S. Appl. No. 13/463,657 dated Oct. 18, 2013.
USPTO Office Action for U.S. Appl. No. 13/223,461 dated Oct. 2, 2013.
Nutaro, J. et al.: "Electric Taxi System Guidance" filed with the USPTO on Sep. 1, 2011 and assigned U.S. Appl. No. 13/223,461.
Hughes, K. et al.: "Electric Taxi Auto-Guidance and Control System" filed with the USPTO on May 3, 2012 and assigned U.S. Appl. No. 13/463,657.
EP Office Action dated Mar. 12, 2013 for application No. 12 182 097.1.
"Distributed and redundant electro-mechanical nose wheel steering system" Dress Paris, DRESS early achievements presentation—Paris Air Show 2009.
Ropp, T. D. et al.: "Automated NextGen Taxi System" FAA Design Competition 2009-2010, Purdue University, 2010.
"Delos Aerospace Developing Wheel Motor Landing Gear System for Aircraft" Electric Vehicle News, May 17, 2010; http://www.electric-vehiclenews.com/2010/05/delos-aerospace-developing-wheel-motor.html.
Dignan, L.: "Honeywell, Safran eye greenairplane taxiing" Jun. 19, 2011; http://www.smartplanet.com/blog/smart-takes/honeywell-safran-eye-green-airplane-taxiing/17172?tag=search-river.
Learmount, D. "Airliners to auto-taxi through fog" Jul. 4, 2006, http://www.flightglobal.com/news/articles/airliners-to-auto-taxi-through-fog-207574/.
Thomas, G.: "Airbus taxi trials" Jul. 15, 2011; http://atwonline.com/eco-aviation/article/airbus-taxi-trials-0715.
"Joint demonstration of new electric taxi system" Aug. 12, 2011; Lufthansa Technik AG.
Cho, A. et al.: "Fully Automatic Taxiing, Takeoff and Landing of a UAV Only with a Single-Antenna GPS Receiver" American Institute of Aeronautics and Astronautics, May 2, 2007.
Doyle, A.: "Farnborough: Messier-Bugatti plans demonstration of electric taxi concept" Jul. 19, 2010, http://www.flightglobal.com/news/articles/farnborough-messier-bugatti-plans-demonstration-of-electric-taxi-concept-344451/.
Kulcsár, B.: "Distributed and Redundant Electromechanical Nose Wheel Steering System (DRESS)" Transport in 7th FP, Jun. 5-8, 2006 Warsawa.
Kobayashi, H., et al.: "Decrease in ground-run distance of airplanes by applying electrically driven wheels" 27th International Congress of the Aeronautical Sciences, Sep. 19-24, 2010, Nice, France, Paper ICAS2010-P6.6.
Ramsey, J.: "Ricardo develops airplane taxi bot to reduce emissions, noise", Nov. 21, 2009, http://www.autoblog.com/2009/11/21/ricardo-develops-airplane-taxi-bot-to-reduce-emissions-noise/.
Katz, E. S.: "Evaluation of a prototype advanced taxiway guidance system (ATGS)" U.S. Department of Transportation, Federal Aviation Administration, Feb. 2000, DOT/FAA/AR-TN00/9.
Kim, J. Y., et al., ANTS—Automated NextGen Taxi System; Dec. 31, 2010; FAA Design Competition 2009-2010; URL: http://emerald.ts.odu.edu/Apps/FAAUDCA.nsf/Ropp%20Management.pdf?OpenFileResource, retrieved from the Internet on Jun. 26, 2013.
EP Search Report dated Aug. 21, 2013 for application No. 13 163 438.8.
USPTO Notice of Allowance for U.S. Appl. No. 13/463,657 dated Aug. 20, 2013.
EP Search Report dated Feb. 28, 2013 for application No. EP 12 182 097.1.
USPTO Office Action for U.S. Appl. No. 13/223,461 dated Aug. 7, 2014.

* cited by examiner

HIGH INTEGRITY, SURFACE GUIDANCE SYSTEM FOR AIRCRAFT ELECTRIC TAXI

TECHNICAL FIELD

Embodiments of the subject matter described herein relate generally to avionics systems such as electric taxi systems. More particularly, embodiments of the subject matter relate to an automatic guidance and control system for a fault tolerant, fail-safe aircraft electric taxi system characterized by high reliability and high integrity, as these terms are used herein.

BACKGROUND

Traditional aircraft taxi systems utilize the primary thrust engines (running at idle) and the braking system of the aircraft to regulate the speed of the aircraft during taxi. Such use of the primary thrust engines, however, is inefficient and wastes fuel. For this reason, electric taxi systems (i.e., traction drive systems that employ electric motors) have been developed for use with aircraft. Electric taxi systems are more efficient than traditional engine-based taxi systems because they can be powered by an auxiliary power unit (APU) of the aircraft rather than the primary thrust engines.

In its simplest form, a crew member may manually steer the aircraft during an electric taxi maneuver using a flight deck controller (e.g. a tiller) while looking out a window. In this case, the crew member utilizes their best judgment regarding execution of their taxi maneuver. An improvement over this process is provided by a visual guidance system wherein a crew member enters airport parameters such as airport congestion, the visual guidance system determines the best taxi path, subject to ATC clearance, and presents it on a cockpit display along with instructions as to the best way to navigate the aircraft along the suggested taxi path; e.g. speed, steering, when to turn thrust engines off and turn electric drive motors on, etc. ATC clearance can include taxi route, assigned take-off or landing runway, hold points etc. and is considered in the calculated path.

While effective, the above described visual guidance system exhibits certain inefficiencies. For example, variations in complying with display guidance instructions, even in the neighborhood of a few seconds, may decrease fuel savings; e.g. a pilot waits a short time before turning thrust engines off. The pilot may execute faster turns than necessary resulting in increased tire wear, or brake more often than necessary causing unnecessary wear and tear on the braking system. In addition, some actions that would increase efficiency are too subtle for the crew to recognize and manage; e.g. optimum acceleration of the aircraft during taxi.

In co-pending U.S. patent application Ser. No. 13/463,657 entitled "Electric Taxi Auto-Guidance and Control System" and assigned to the assignee of the present invention, an auto-guidance and control system for use in conjunction with an aircraft taxi system is described which may be operated in an automatic mode (auto-mode) or a manual mode should the automatic mode become inoperative or otherwise unavailable. The aircraft obtains aircraft status data and accesses airport feature data. This data is provided to a processor which generates taxi guidance information that is displayed. The processor generates taxi path commands that are provided to taxi path controllers in the auto-mode. The display and operation in the auto-mode must be monitored by the crew including viewing out the windows, to rapidly detect any failure of the auto-mode guidance system to avoid potential mishaps.

Certification authorities such as the FAA have great concern for passenger and crew safety. Thus, they provide regulations and design guidance so as to achieve a high degree of availability and integrity to ensure safety. That is there must be assurances that equipment must work when needed (i.e. be available) and not suffer undetected failures nor generate misleading guidance that cannot be remedied by pilot intervention (i.e. operate with high integrity).

For example, if an event such as loosing automatic or visual guidance in bad weather is identified by certification authorities and aircraft operators as "major" because it could significantly increase crew work load, the authorities would require that such an event have a probability of occurrence of no more than $10^{-5}$ per flight hour. A more serious event may be declared "hazardous" and have a probability of occurrence of no more than $10^{-7}$ per flight hour. These requirements are set forth in FAA specification AC25-1309.

In view of the foregoing, is would be desirable to provide an electric taxi automatic guidance and control system capable of guiding and controlling an aircraft during a taxi maneuver in severe weather conditions and limited visibility with virtually no crew involvement.

BRIEF SUMMARY

In accordance with the foregoing, there is provided a high-integrity auto-guidance and control method for use in conjunction with an aircraft electric taxi drive system The method comprises obtaining taxi path data, generating in a plurality of processors taxi path guidance and control information from the taxi path guidance data, and sending commands derived from the taxi path guidance and control information from one of the plurality of processors based on a predetermined priority scheme to at least one electric taxi controller.

There is also provided a high-integrity guidance and control system for use on-board an aircraft equipped with an electric taxi mechanism. The system comprises a first source of taxi path guidance data, an electric taxi controller, and a plurality of processors coupled to the first source and to the electric taxi controller and configured to (1) generate taxi path guidance and control information from taxi path guidance data, and (2) send commands derived from the taxi path guidance control information in one of the plurality of processors based on a predetermined priority scheme to the electric taxi controller if the taxi path guidance data in a first one of the plurality of processors substantially compares with the taxi path guidance data in a second one of the plurality of processors.

An auto-guidance and control method for use in conjunction with an aircraft electric taxi system is also provided. The method comprises obtaining aircraft status data, accessing airport feature data, and receiving from each of the first plurality of processors taxi path guidance and control data. The taxi path guidance information is then compared in a second of plurality of processors. The method continues by selecting taxi path guidance and control data from one of the plurality of processors in accordance with a predetermined scheme of priority and sending commands derived from the selected guidance and control data to the electric taxi drive system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the following detailed description

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The system and methods described herein can be deployed with any vehicle that may be subjected to taxi operations, such as aircraft, ships, etc. The exemplary embodiment described herein assumes that an aircraft includes an electric taxi system, which utilizes one or more electric motors as a traction system to drive the wheels of the aircraft during taxi operations. The system and methods presented here provide guidance information to the flight crew for purposes of optimizing or otherwise enhancing the operation of the electric taxi system. Such optimization may be based on one or more factors such as, without limitation: fuel conservation; prolonging the useful life of the brake system; avoiding ground vehicles or other aircraft; and reducing taxi time. In certain embodiments, the taxi guidance information is rendered with a dynamic synthetic display of the airport field and surrounding traffic to provide visual guidance to the flight crew. The taxi guidance information may include a desired taxi route or path, a target speed for the electric taxi system to maintain, a graphical indicator or message that identifies the best time to turn the primary thrust engine(s) on or off, best time to turn on or shut off the auxiliary power unit (APU) or the like. The display system may be implemented as an onboard flight deck system, as a portable computer, as an electronic flight bag, or any combination thereof.

Figure 1:
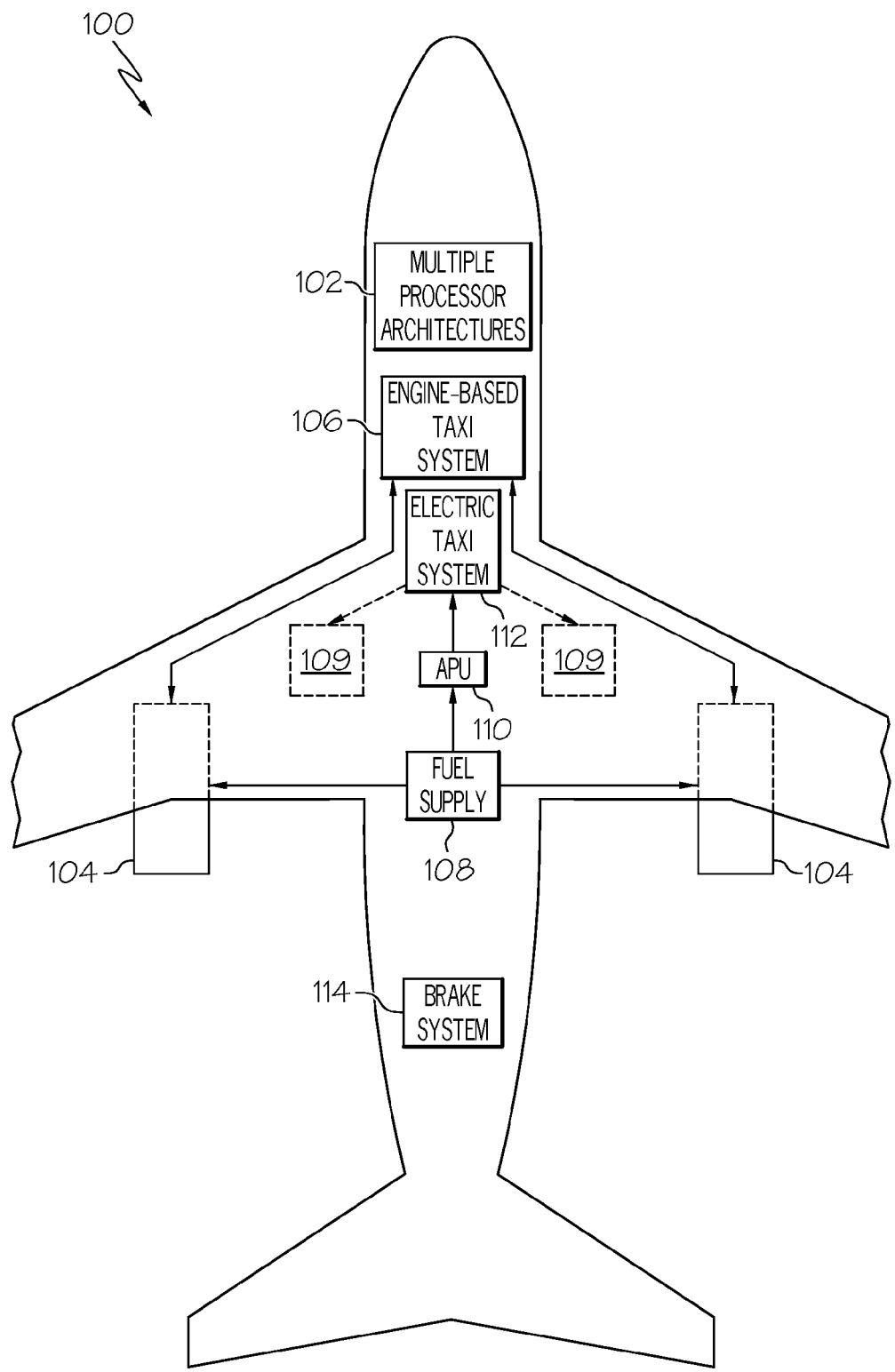
FIG. 1 is a simplified schematic representation of an aircraft having an electric taxi system.

FIG. 1 is a simplified schematic representation of an aircraft 100. For the sake of clarity and brevity, FIG. 1 does not depict the vast number of systems and subsystems that would appear onboard a practical implementation of the aircraft 100. Instead, FIG. 1 merely depicts some of the notable functional elements and components of the aircraft 100 that support the various features, functions, and operations described in more detail below. In this regard, the aircraft 100 may include, without limitation: a multiple processor architecture 102 configured for high integrity and availability; one or more primary thrust engines 104; an engine-based taxi system 106; a fuel supply 108; wheel assemblies 109; an auxiliary power unit (APU) 110; an electric taxi system 112; and a brake system 114. These elements, components, and systems may be coupled together as needed to support their cooperative functionality.

Each processor architecture 102 may be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor architecture 102 is configured to support various electric taxi guidance processes, operations, and display functions.

In practice, each processor architecture 102 may be realized as an onboard component of the aircraft 100 (e.g., a flight deck control system, a flight management system, or the like), or it may be realized in a portable computing device that is carried onboard the aircraft 100. For example, the processor architecture 102 could be realized as the central processing unit (CPU) of a laptop computer, a tablet computer, or a handheld device.

Each processor architecture 102 may include or cooperate with an appropriate amount of memory (not shown), which can be realized as RAM memory, flash memory, EPROM memory, EEPROM memory, registers, a hard disk, a removable disk, a CD-ROM, or any other form of storage medium known in the art. In this regard, the memory can be coupled to the processor architecture 102 such that the processor architecture 102 can read information from, and write information to, the memory. In the alternative, the memory may be integral to the processor architecture 102. In practice, a functional or logical module/component of the system described here might be realized using program code that is maintained in the memory. Moreover, the memory can be used to store data utilized to support the operation of the system, as will become apparent from the following description.

The illustrated embodiment of the aircraft includes at least two primary thrust engines 104, which may be fed by the fuel supply 108. The engines 104 serve as the primary sources of thrust during flight. The engines 104 may also function to provide a relatively low amount of thrust (e.g., at idle) to support a conventional engine-based taxi system 106. When running at idle, the engines 104 typically provide a fixed amount of thrust to propel the aircraft 100 for taxi maneuvers. When the engines 104 are utilized for taxi operations, the speed of the aircraft is regulated by the brake system 114.

Exemplary embodiments of the aircraft 100 also include the electric taxi system 112 (which may be in addition to or in lieu of the engine-based taxi system 106 which typically provides a pilot with manual control of the aircraft). In certain implementations, the electric taxi system 112 includes at least one electric motor (not shown in FIG. 1) that serves as the traction system for the drive wheel assemblies 109 of the aircraft 100. The electric motor may be powered by the APU 110 onboard the aircraft 100, which in turn is fed by the fuel supply 108. As described in more detail below, the electric taxi system 112 can be controlled by a member of the flight crew to achieve a desired taxi speed. Unlike the traditional engine-based taxi system 106, the electric taxi system 112 can be controlled to regulate the speed of the drive wheels without requiring constant or frequent actuation of the brake system 114. The aircraft 100 may employ any suitably configured electric taxi system 112, which employs electric motors to power the wheels of the aircraft during taxi operations.

Figure 2:
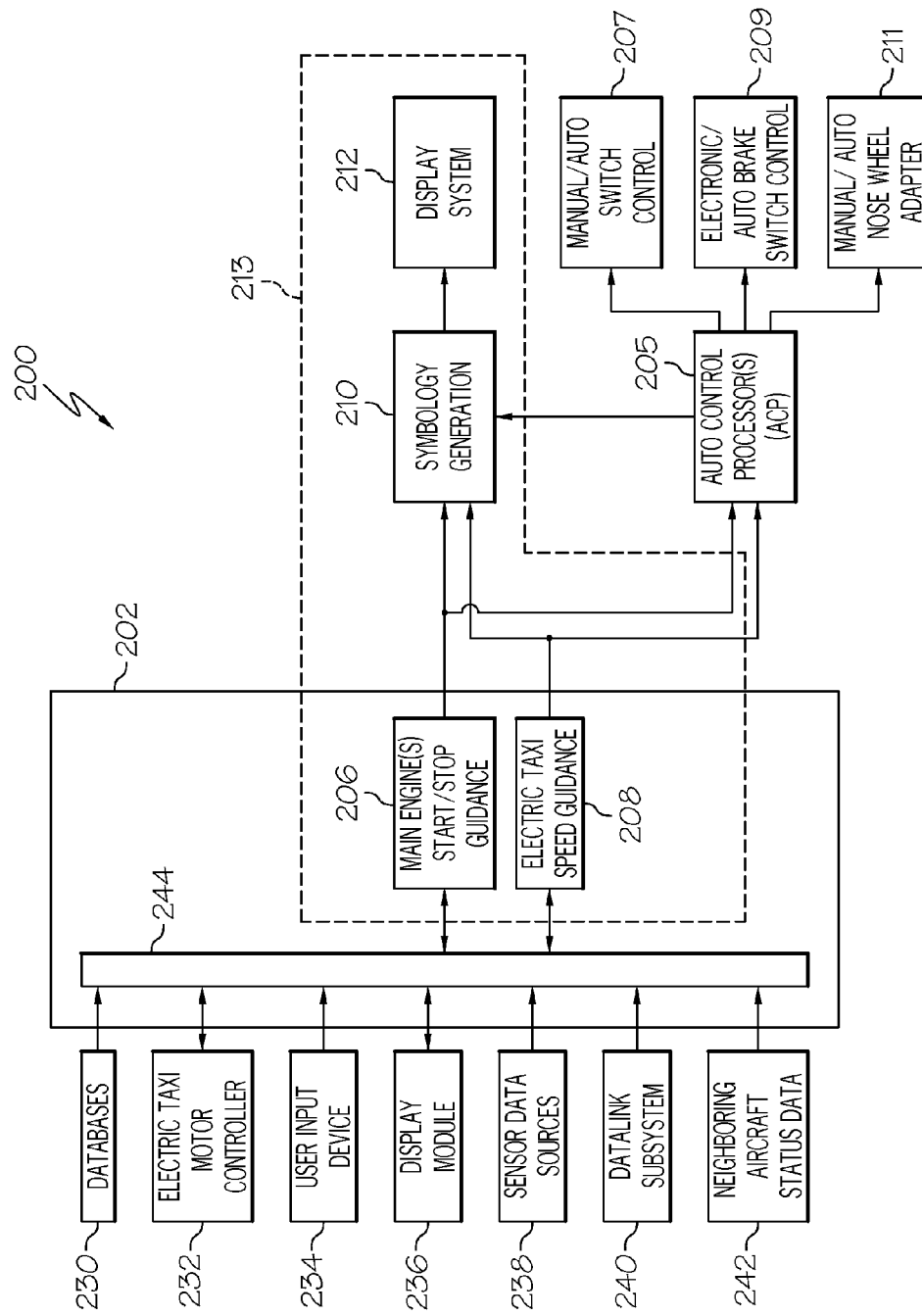
FIG. 2 is a general block diagram of an exemplary embodiment of an automatic electric taxi guidance system suitable for use on an aircraft.

FIG. 2 is a schematic representation of an exemplary embodiment of an automatic guidance (auto-guidance) and control system 200 suitable for use in conjunction with the aircraft 100. Depending upon the particular embodiment, the taxi auto-guidance system 200 may be realized in conjunction with a ground management system 202, which in turn may be implemented in a line replaceable unit (LRU) for the aircraft 100, in an onboard subsystem such as the flight deck display system including a plurality of processors, in an integrated modular avionics (IMA) system, a flight management system (FMS), an inertial reference system (IRS), or the like. The illustrated embodiment of the taxi auto-guidance system 200 generally includes, without limitation: an engine start/stop guidance module 206; an electric taxi speed guidance module 208; a symbology generation module 210; a display system 212; a plurality of auto control processors (ACP) 205; manual/auto switch control 207; electric/auto brake switch control 209; and manual/auto nose wheel adaptor 211. The taxi guidance system 200 may also include or cooperate with one or more of the following elements, systems, components, or modules: databases 230; a controller 232 including a plurality of processors for controlling the electric taxi system motors; at least one user input device 234; a display module 236; sensor data sources 238; a data link subsystem 240; and a source of neighboring aircraft location and status data 242 including collision sensors. In practice, various functional or logical modules of the taxi guidance system 200 may be implemented with the processor architecture 102 (and associated memory) described above with reference to FIG. 1. The taxi guidance system 200 may employ any appropriate communication architecture 244 or arrangement that facilitates inter-function data communication, transmission of control and command signals, provision of operating power, transmission of sensor signals, etc.

The taxi guidance system 200 is suitably configured such that the engine start/stop guidance module 206 and/or the electric taxi speed guidance module 208 are responsive to or are otherwise influenced by a variety of inputs, and together with symbology generation 210 and display system 212 comprise a visual electric taxi guidance system 213 (delineated with a dashed line). For this particular embodiment, the influencing inputs are obtained from one or more of the sources and components listed above. The outputs of the engine start/stop guidance module 206 and/or the electric taxi speed guidance module 208 are provided to the symbology generation module 210, which generates corresponding graphical representations suitable for rendering with a synthetic display of an airport field. The symbology generation module 210 cooperates with the display system 212 to present taxi guidance information to the user.

The databases 230 represent sources of data and information that may be used to generate taxi guidance information. For example the databases 230 may store any of the following, without limitation: airport location data; airport feature data, which may include layout data, coordinate data, data related to the location and orientation of gates, runways, taxiways, etc.; airport restriction or limitation data; aircraft configuration data; aircraft model information; engine cool down parameters, such as cool down time period; engine warm up parameters, such as warm up time period; electric taxi system specifications; and the like. In certain embodiments, the databases 230 store airport feature data that is associated with (or can be used to generate) synthetic graphical representations of a departure or destination airport field. The databases 230 may be updated as needed to reflect the specific aircraft, the current flight plan, the departing and destination airports, and the like.

The controller 232 represents the control logic and hardware for the electric taxi motor. In this regard, the controller 232 may, in fact, comprise multiple controllers and processors and/or include one or more user interface elements that enable the pilot to activate, deactivate, and regulate the operation of the electric taxi system as needed. The controller 232 may also be configured to provide information related to the status of the electric taxi system, such as operating condition, wheel speed, motor speed, and the like.

The user input device 234 may be realized as a user interface that receives input from a user (e.g., a pilot) and, in response to the user input, supplies appropriate command signals to the taxi guidance system 200. The user interface may be any one, or any combination, of various known user interface devices or technologies, including, but not limited to: a cursor control device such as a mouse, a trackball, or joystick; a keyboard; buttons; switches; or knobs, or even voice and gesture commands. Moreover, the user interface may cooperate with the display system 212 to provide a touch screen interface. The user input device 234 may be utilized to acquire various user-selected or user-entered data, which in turn influences the electric taxi guidance information generated by the taxi guidance system 200. For example, the user input device 234 could obtain any of the following, without limitation: a selected gate or terminal at an airport; a selected runway; user-entered taxiway directions; user-entered airport traffic conditions; user-entered weather conditions; runway attributes; and user options or preferences.

The display module 236 may include a software application and/or processing logic to generate dynamic synthetic displays of airport fields during taxi operations. The display module 236 may also be configured to generate dynamic synthetic displays of a cockpit view during flight. In practice, the display module 236 cooperates with the symbology generation module 210 and the display system 212 to render graphical indicia of electric taxi guidance information, as described in more detail below.

The sensor data sources 238 represents various sensor elements, detectors, diagnostic components, and their associated subsystems onboard the aircraft. In this regard, the sensor data source 238 functions as sources of aircraft status data for the host aircraft. In practice, the taxi guidance system 200 could consider any type or amount of aircraft status data including, without limitation, data indicative of: tire pressure; nose wheel angle; brake temperature; brake system status; outside temperature; ground temperature; engine thrust status; primary engine on/off status; aircraft ground speed; geographic position of the aircraft; wheel speed; electric taxi motor speed; electric taxi motor on/off status; or the like. In addition, faults of the system components are detected and displayed using continuous self-tests (e.g. processor's memory tests). In addition, tests are initiated prior to system activation when the system is turned on. Reconfiguration as described below can be automatic or the crew can implement selected manual reconfigurations.

The data link subsystem 240 is utilized to provide air traffic control data to the host aircraft, preferably in compliance with known standards and specifications. Using the data link subsystem 240, the taxi guidance system 200 can receive air traffic control data from ground based air traffic controller stations and equipment. In turn, the system 200 can utilize such air traffic control data as needed. For example, the taxi clearance, assigned takeoff runway and other airport navigation instructions may be provided by an air traffic controller using the data link subsystem 240 or any applicable communications link.

In an exemplary embodiment, the host aircraft supports data communication with one or more remote systems; e.g. from airport surface vehicles which, besides aircraft, may include other vehicles such as refueling trucks and security vans. More specifically, the host aircraft receives status data for neighboring aircraft using, for example, an aircraft-to-aircraft data communication module (i.e., the source of neighboring aircraft status data 242) or multiple on-board collision avoidance sensors. For example, the source of neighboring aircraft status data 242 may be configured for compatibility with Automatic Dependent Surveillance-Broadcast (ADS-B) technology, with active Mode S interrogation technology, and/or with similar technologies.

The engine start/stop guidance module 206 and the electric taxi speed guidance module 208 are suitably configured to respond in a dynamic manner to provide real-time guidance for optimized operation of the electric taxi system. In practice, the taxi guidance information (e.g., taxi path guidance information, start/stop guidance information for the engines, and speed guidance information for the electric taxi system) might be generated in accordance with a fuel conservation specification or guideline for the aircraft, in accordance with an operating life longevity specification or guideline for the brake system 114 (see FIG. 1), and/or in accordance with other optimization factors or parameters. To this end, the system processes relevant input data and, in response thereto, generates taxi path guidance information related to a desired taxi route to follow. It should be noted that as used herein, the word "route" means the various directions an aircraft takes to reach a target location. The word "path" comprises the "route" and the variations in acceleration, velocity, and braking along the route. Thus, route may be shown in a single map and path is the route including speed, acceleration, and breaking commands along the route.

The engine start/stop guidance module 206 processes relevant input data and, in response thereto, generates start/stop guidance information that is associated with operation of the primary thrust engine(s) and/or is associated with operation of the electric taxi system.

As explained in more detail below, the start/stop guidance information may be presented to the user in the form of displayed markers or indicators in a synthetic graphical representation of the airport field. The electric taxi speed guidance module 208 processes relevant input data and, in response thereto, generates speed guidance information for the onboard electric taxi system. The speed guidance information may be presented to the user as a dynamic alphanumeric field displayed in the synthetic representation of the airport field.

The symbology generation module 210 can be suitably configured to receive the outputs of the engine start/stop guidance module 206 and the electric taxi speed guidance module 208, and process the received information in an appropriate manner for incorporation, blending, and integration with the dynamic synthetic representation of the airport field. Thus, the electric taxi guidance information can be merged into the display to provide enhanced situational awareness and taxi instructions to the pilot in real-time.

The display system 212 includes at least one display element that cooperates with a suitably configured graphics system (not shown), which may include symbology generation module 210 as a component thereof. This allows the display system 212 to display, render, or otherwise convey one or more graphical representations, synthetic displays, graphical icons, visual symbology, or images associated with operation of the host aircraft on the display element, as described in greater detail below. In practice, the display element receives image rendering display commands from the display system 212 and, in response to those commands, renders a dynamic synthetic representation of the airport field during taxi operations.

The display element may be realized as an electronic display configured to graphically display flight information or other data associated with operation of the host aircraft under control of the display system 212. The display system 212 is usually located within a cockpit of the host aircraft. Alternatively (or additionally), the display system 212 could be realized in a portable computer.

Referring still to FIG. 2, the outputs of the engine start/stop guidance module 206 and the electric taxi speed guidance module 208 are applied to inputs of auto control processor (ACP) 205 comprised of a plurality of processors 205a, 205b, etc., which control the processes, procedures, and sub-functions associated with electric taxi auto-guidance and control, and which, as described below, provide the requisite integrity and reliability. As can be seen, outputs of ACP 205 provide control and command signals to manual/auto switch control 207, electric/auto brake switch control 209, and manual/auto nose wheel adapter 211, described in more detail hereinafter in connection with FIGS. 3-8. For now, it should be appreciated that ACP 205 is primarily responsible for high integrity, highly reliable auto-guidance and control. Visual guidance function 213 may be monitored and available as a backup should a failure in the operation of the auto guidance and control function occur.

Figure 3:
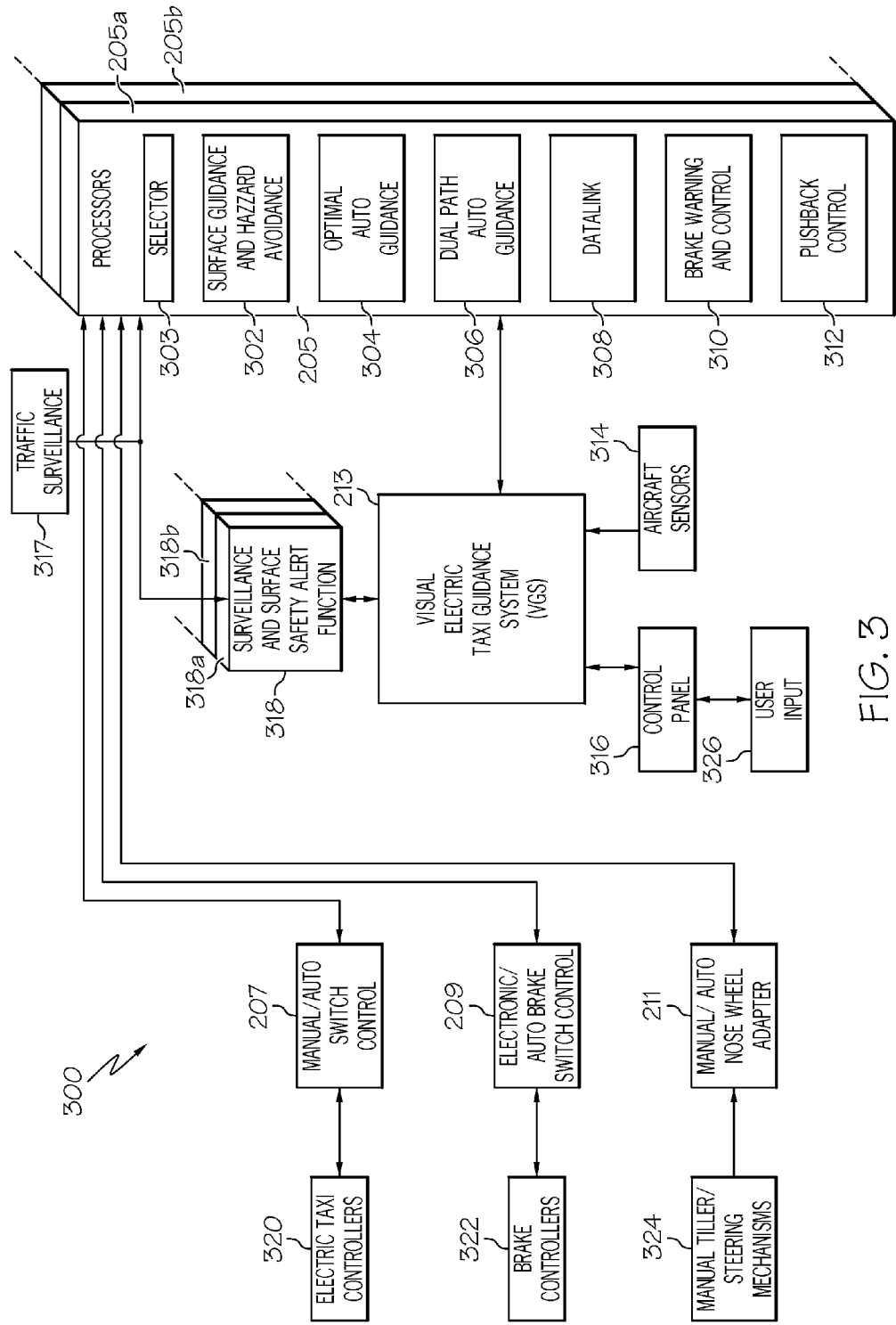
FIG. 3 is a more detailed block diagram of a further exemplary embodiment of a high-integrity, high-availability automatic electric taxi guidance system suitable for use on an aircraft in accordance with an embodiment.

FIG. 3. Is a schematic representation of an exemplary embodiment of an auto guidance and control system 300 suitable for use with aircraft 200 wherein like elements are denoted with like reference numerals. As can be seen, ACP 205 includes a plurality of processors 205a, 205b, etc. that each perform a number of sub-functions; i.e. surface guidance and hazard avoidance sub-function 302; optimal auto guidance sub-function 304; dual-path auto guidance sub-function 306; data link sub-function 308; brake warning and control sub-function 310, and pushback control sub-function 312. Each of these may reside in one or more processors as described.

Surface guidance and hazard avoidance sub-function 302 is capable of automatically providing surface guidance and smart hazard avoidance to aircraft 100, and is capable of alerting the flight crew should such a hazard arise. To do this, surface guidance and hazard avoidance sub-function considers surveillance information from traffic including surrounding aircraft and ground vehicles 317. This information may be provided and/or include (1) transponders on traffic equipped with Automatic Dependence Surveillance Broadcast (ADS-B), Traffic Information Service Broadcast (TIS-B), or other sources such as on-board multiple dissimilar sensors; (2) own aircraft information; (3) sensors (e.g. radar or ultrasonic sensors on wing-tips); and (4) airport taxiway and runway databases including the cleared taxi route and assigned runway. The guidance function and overall safety on the airport surface will be improved by receiving information such as (1) taxi route and assigned runway information for other aircraft received from the other aircraft or from Air Traffic Control (ATC); (2) planned speed and acceleration of other aircraft equipped with electric taxi control and guidance systems and data linked from the other aircraft; and (3) external signal lights for indicating intended actions to traveling aircraft including flashing lights and/or lights of different colors. Hazard alerts may be provided if an aircraft is in a potential hazardous situation. Such alerts may be formulated within the auto-guidance and control system and/or in other aircraft systems. Such alerts may include advisory, cautionary, and/or audible and visual alerts relating to, (1) potential collisions with other aircrafts or ground vehicles; (2) crossing or entering a runway occupied by another aircraft or ground vehicle; (3) aircraft deviation from an assigned taxi route; and (4) receipt or acceptance by the aircraft of a taxi clearance that includes taxiways and runaways that are not appropriate for the aircraft, e.g. aircraft too heavy or too wide. Alerts may be auditory, visual, directive or non-directive and the response may be automated. For example, an alert to warn of an impending collision will cause the system to automatically generate a hold.

Surface guidance and hazard avoidance sub-function may also utilize position information of other aircraft to change the taxi path when other aircraft, vehicles, or objects block the natural or assigned route. In most cases, permission from the tower may be required to deviate from the assigned path. If there are two entrances to a runway, and a first aircraft is already waiting at one, the auto-guidance and control system of a second aircraft will detect that an assigned entrance is blocked and determine a new path to the other entrance. Visual electric taxi guidance system (VGS) 213 will display the new path option and produce an alert to the crew. If several aircrafts are in line for access to a runway for takeoff, the auto-guidance and control system will monitor the position of the aircraft in front and then start, stop, and adjust the speed as necessary to proceed in line.

Optimal auto guidance sub-function 304 determines the optimum path based on minimizing APU fuel, brake wear, tire wear, and electric drive wear taking into account effects caused by surface conditions such as rain or ice. It may also take into account the need for timeliness; e.g. proper gate time arrival and takeoff time. The crew may be able to choose among options such as (1) minimal cost; e/g/ fuel, tire wear, etc., (2) timeliness; e.g. gate and runway time, and (3) minimum time. Optimum auto-guidance sub-function may utilize aircraft-specific parameters stored in the aircraft databases to make optimal path determinations. In addition, the crew may enter additional information such as runway condition if not already stored in the VGS.

If desired, electric taxi operation may be commenced while simultaneously utilizing a thrust engine if permitted by the aircraft; e.g. APU assist to engine-start. This permits the crew to start the thrust engines without coming to a complete stop. After the thrust engine start and predetermined parameters (e.g. speed) are reached, both the electric taxi auto-guidance and control system and the electric taxi drive disengage. In a similar fashion, proper timing is determined for shutting the thrust engines off after landing to allow for proper cooling. Some operational situations may extend this phase to the use of one thrust engine with the electric taxi engaged for a period of time.

The display system 212 (FIG. 2) will graphically show the optimum auto-guidance path (auto-path) when auto-guidance is engaged. When auto-guidance is not engaged, display system 212 will show the manual guidance path. For example, the auto path display may provide an indication of how well the aircraft is achieving the optimum acceleration.

Dual path auto guidance sub-function 306 coordinates the two paths, auto and manual. When auto engaged, the dual path function ensures that the display information relevant to auto control is displayed and the proper commands issued to the rest of the system. If auto mode is not engaged, the dual path function ensures that the display reflects manual guidance instructions and that commands are not sent to other systems. Data link sub-function 308 enables the tower to command the aircraft to halt or to provide the aircraft with an alternate plan. The pilot may accept or reject the plan, typically after consultation with the tower.

Brake warning and control sub-function 310 can operate in two modes; i.e. a manual mode and an automatic mode. In the manual mode, aircraft may be slowed or stopped by shutting off the electric drive motors and allowing the aircraft to coast to a reduced speed or stop. Additionally, the electric drive motors themselves may be used as an aid in braking if regenerative braking is also employed to help reduce the aircraft speed. If additional braking is required, a warning is displayed on the VGS instructing the crew to apply braking. In the automatic mode, the brakes are applied automatically.

In most cases, push-back from the gate is accomplished using tugs while ground personnel monitor the maneuver. However, the ACP will be equipped with a pushback control sub-function 312 which will cooperate with other equipment such as rear facing cameras and a proximity detection system using, for example, multiple sensors 314. The electric guidance and control system may determine the pushback path and generate a hold, if necessary. Pushback control sub-function 312 limits speed and control braking.

As stated previously, VGS 213 is coupled to ACP 205. Also coupled to VGS are the various aircraft sensors; e.g. tire pressure sensors, brake temperature sensors, pushback sensors, etc.; one or more control panels 316 and user input devices 326 (discussed in more detail in conjunction with FIGS. 4 and 5), and a surveillance and surface safety alert function 318. The surveillance and surface alert function 318 performs traffic and other hazard avoidance not specific to whether there is an electric taxi system onboard. This function receives traffic surveillance data from traffic surveillance 317, and the alerts from this system may be fed to surface guidance and hazard avoidance function 302. Surveillance and surface safety alert function 318 also receives ADS-B In data and collision avoidance data, both of which can also be provided to surface guidance and hazard alert sub-function 302. Surface guidance and hazard alert sub-function 302 then determines the appropriate action, if any, for the electric taxi system: e.g. brake, slow down, etc. The VGS provides manual guidance information to the crew even if the auto guidance is not engaged.

The surveillance and surface safety alert function likewise comprises a plurality of processors 318a, 318b, etc., that in conjunction with processors 205a, 205b, etc., perform traffic and other hazard avoidance in a manner to be described so as to provide the requisite integrity and availability. The alerts from this system can be fed into the surface guidance and hazard avoidance sub-function 302 performed by each of processors 205a, 205b, etc. For example, one such input may comprise ADS-B In data, and other such inputs may comprise collision avoidance data from sensors, each of which can also be fed, respectively, to processors 318a, 318b, etc., and in conjunction with processors 205a, 205b, etc. to determine what to do (e.g., brake, slow down, wait to perform some action, or do nothing), in a manner to be described hereinbelow.

In addition to providing auto-guidance to avoid unsafe situations, visual and audio alerts for potentially hazardous situations may include advisory, cautionary or warning alerts when (1) an aircraft has deviated from the assigned taxi clearance; (2) an aircraft has received or accepted a taxi clearance that includes taxiways or runways that are not appropriate given the performance of the aircraft; e.g. the aircraft may be too heavy or too wide for a taxiway or runway; (3) an aircraft is crossing or entering a runway that is occupied by another aircraft or ground vehicle; or (4) a potential collision with another aircraft or ground vehicle is detected.

The integrity of the embodiment herein described provides the crew with confidence that the auto guidance system described herein will avoid such situations, and that any generated alerts will rarely provide the crew with misleading data. To enhance this function, display 212 in FIG. 2 may provide (1) an airport map showing taxiways, runways, and other key airport features; (2) own aircraft location; (3) guidance information; and (4) optimum travel speed for electric taxi movement. Display 212 may also provide (1) traffic on or near the airport surface such as other aircraft and ground vehicles; (2) indications of important situations, such as runways that are currently occupied; and (3) alerts to other potentially hazardous situations.

A control panel 316 is shown in FIG. 3 and enables a crew member to interface with VGS 213 and therefore the entire auto-guidance and control system. Control panel 316 may be separate or may be integrated with other control panels. It may also be coupled to a user input device 326 such as a keyboard, cursor control, touch screen or other input device.

Manual/auto switch controller 207 is coupled to the electric taxi controllers 320 and selectively applies either the manual controls or the automatic controls to the left and right taxi controllers to adjust speed. Electric/auto brake switch controller 209 is coupled to the brake controllers 322 and selectively permits either the auto-guidance and control system or the normal aircraft braking commands to control the aircraft brakes. Manual/auto nose wheel adapter 211 is coupled to manual tiller 324. In some aircraft, adapter 211 contains the servo-mechanisms that control the hydraulics which, in turn, control the nose wheel. In other aircraft, the hydraulics are replaced with electronics. In any event, the manual/auto nose wheel adapter causes the auto-guidance to be disengaged when tiller 324 is moved indicating that the crew wants to immediately take control.

Figure 4:
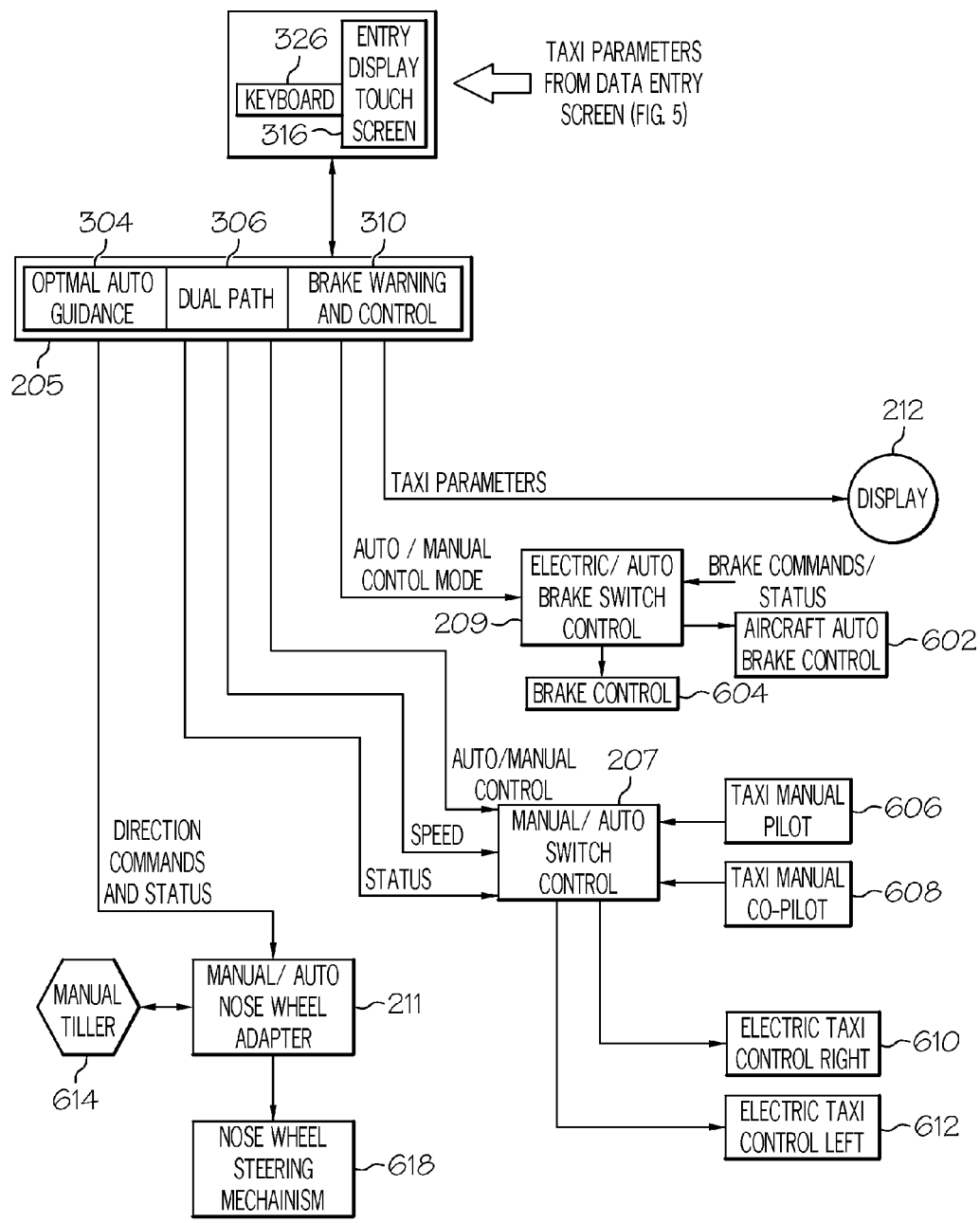
FIG. 4 is a detailed block diagram of a still further exemplary embodiment of an automatic electric taxi guidance system suitable for use on an aircraft.
Figure 5:
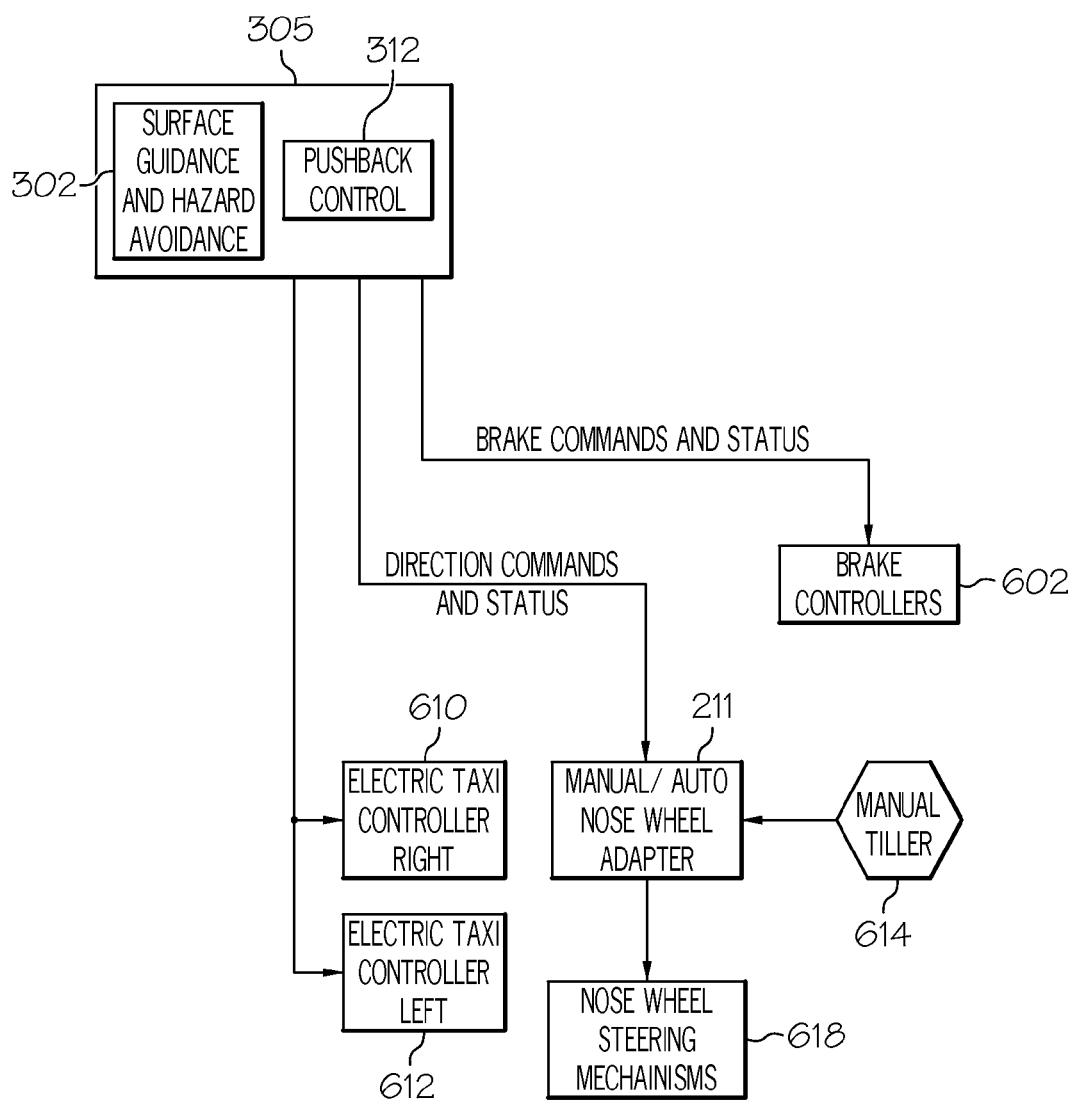
FIG. 5 is a block diagram illustrating the push back subfunction of the embodiment shown in FIG. 3.

FIG. 4 is a block diagram illustrating the operation of the electric taxi auto-guidance and control system in accordance with an embodiment for a typical operation prior to landing and on the ground thereafter. After the auto-guidance and control system is activated, the crew enters the appropriate parameters into ACP 205 wherein an auto-guidance path is determined and passed on to other functions via dual path function 306. The path/route is also passed on to the VGS, and the auto guidance is displayed on the flight deck; e.g. display 212. The paths are determined by path function 306. That is, a crew member enters the initial path data and engages, and the path and targets are transferred to the auto-guidance which is then activated. ACP 205 transmits command information to electric/auto brake switch control 209, manual/auto switch control 207, and manual/auto nose wheel adapter 211 placing the aircraft in the auto-mode. The ACP 205 provides commands such as direction commands, which are then utilized to control a nose wheel steering mechanism 211 and manual tiller 64 is rendered inoperative. When electric/auto brake switch control 209 is placed in the auto-mode, auto brake controllers 602 receive commands, speed, and status signals from APC 205 as to when to apply braking forces, rather than from manual brake control 604. APC 205 places manual/auto switch control 207 in the auto mode, and the right and left electric taxi controllers 610 and 612, respectively, receive commands from controllers 610 and 612 rather than from manual controllers 606 and 608 on the flight deck; (e.g. joy sticks used to steer). In addition, the crew can force manual mode by moving tiller 614. The nose wheel adapter will accept manual commands from the tiller as shown in FIG. 5. Similarly, is the crew provides a manual brake action, brake switch control 209 will revert to a manual mode as shown in FIG. 4.

During surface operations, it may be necessary for the crew to respond to tower instructions and comply with surface procedures that are not automated. The flight crew always has the option to override the auto guidance operations, enable a temporary halt, or redirect the aircraft by entering new data.

The landing process may be summarized as follows. Prior to landing, the crew may select auto guidance and then enter airport parameters or confirm existing parameters as valid for that airport. This information may be received, in whole or in part, via data link. A landing is automatically detected by sensors; (e.g. due to pressure on wheel switches, ground speed), and the ACP 205 determines and notifies the crew when to turn the engines off. After the engines are turned off, the auto mode is entered automatically.

If auto taxi is not engaged, upon landing and after safe braking, the crew engages auto control manually. It is assumed that at this point the APU (110 in FIG. 1) is on. The aircraft begins maneuvering in accordance with the taxi path generated by the auto guidance system. Due to the high integrity and availability of the system, there is a reduced need for the crew to continuously monitor the display or the path through the windows. At a time determined by the electric taxi auto-guidance and control system, the engines are shut down. The aircraft follows the auto-path and approaches the gate area under auto control. The auto guidance enables the aircraft to safely taxi to the gate and park.

For takeoff, the crew first obtains taxi clearance and takeoff information. This may be obtained via voice or data link. Taxi clearance is provided to the VGS via flight crew entry or automatically from the data link. After turning on the APU 110 (FIG. 1), operation of the electric taxi system is verified and the electric taxi auto guidance and control system is engaged. The aircraft maneuvers and taxis in accordance with the auto guidance system. The system automatically detects hazards and may halt the system to provide additional safety. At a time determined by the auto-guidance function, the engines are started. If auto pushback is engaged, the system automatically directs the aircraft to move back, turn, and align with the taxi route to the desired runway. Pushback can be manually initiated or initiated via a data link command to minimize queuing before takeoff add/or to minimize the cost of the entire flight (gate-to-gate).

FIG. 5 is a block diagram illustrating the operation of the pushback control sub-function 212 in ACP 205. ACP 205 detects the optimum path and using this, the pushback control functions determine the additional commands needed to back the aircraft and turn the aircraft in the proper direction. After backup begins, the Surface Guidance and Hazard Avoidance signals are transmitted, if needed, to the brake controllers 602, electric taxi controllers 610 and 612, and nose wheel steering mechanism 618. The aircraft moves back along the determined backup path, turns in the proper direction and continues along the guidance path. If a collision is imminent, the aircraft halts, a warning is displayed identifying the hazard that caused the halt, and the backup is discontinued. If the cause of the halt is removed, pushback is restored by the crew via the control panel.

As stated previously, ACP 205 and surveillance and surface alert function 318 each comprise multiple processors 205a, 205b, etc. and 318a, 318b, etc., respectively, to provide integrity with availability. For example, in the case where three processors are employed to each perform the required functions, if at least two processors provide results that compare with each other within a predetermined tolerance, then the output from one of the two processors can be used as the guidance parameter control signal. The output from the third processor is irrelevant unless the first and second processors do not agree, in which case the output from the first processor is compared with the output from the third processor. If they agree, then the output from the first is used as the guidance signal. If not, the output from the second processor is compared with the output from the third processor. If successful, it can be assumed that the first processor has failed, and the output of the second processor is used as the guidance parameter control signal. If the comparison between the second and third processors fails, a signal is generated indicating that all three processors have failed. If desired, a number of comparison failures (e.g. three in a row) may be required before any action is taken so as to avoid considering failures due to momentary conditions (e.g. noise) causing a shutdown.

Figure 6:
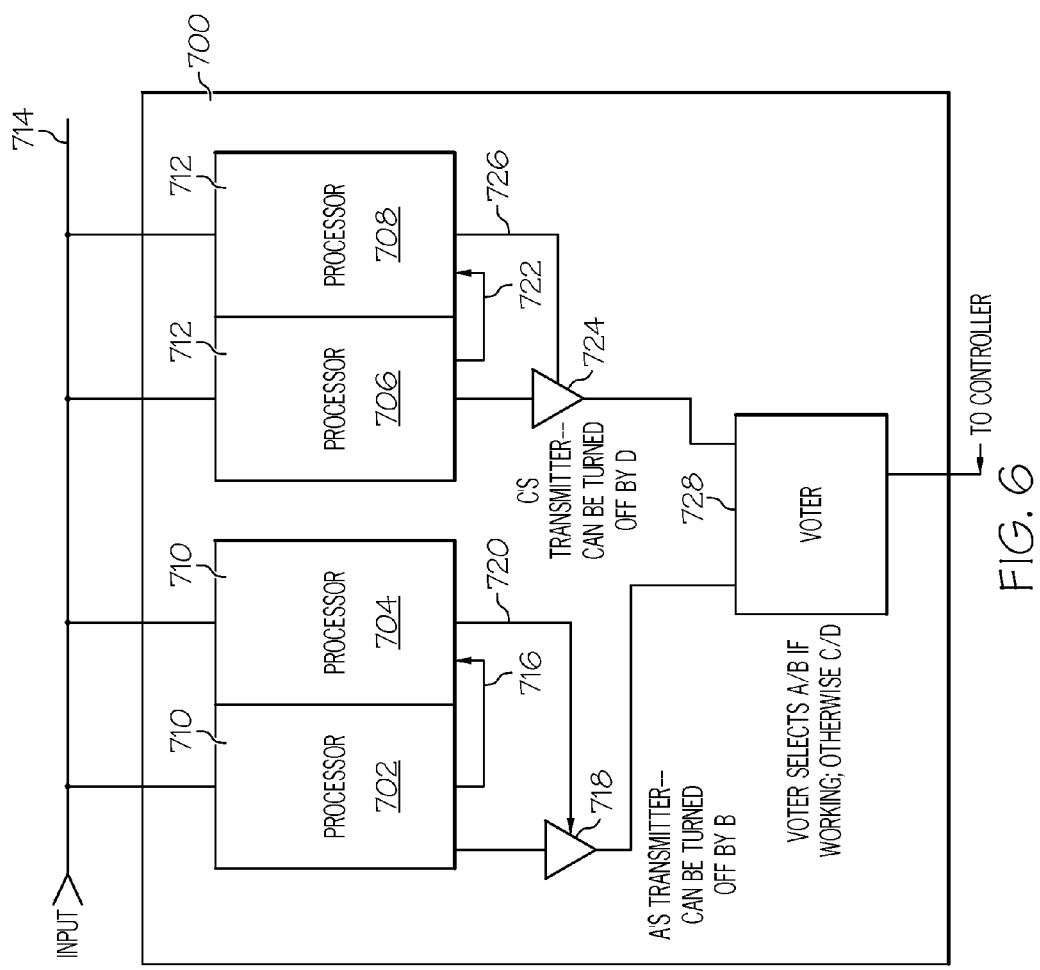
FIG. 6 is a functional block diagram of a selector in accordance with an embodiment.

FIG. 6 is a functional block diagram of a selector assembly 700 for receiving a taxi control signal (e.g. speed) on bus 714 at (1) first, second, third, and fourth processors, and (2) first and second pairs of processors 710 and 712 via bus 714, the first pair of processors 710 comprised of processors 702 and 704, and the second pair of processors comprised 706 and 708. Processor 702 is configured to provide a control signal to transmitter 718 via conductor 720. Processor 706 is configured to provide a control signal to processor 708 via conductor 722, and processor 708 is configured to provide a control signal to transmitter 724 via conductor 726.

Processor 704 compares its output parameter to that produced by processor 704. If they compare within a predetermined tolerance, the output of processor 702 is passed via transmitter 718 to voter 728 which then makes the signal available to the appropriate controller. If the results from processors 702 and 704 do not compare within the predetermined tolerance, transmitter 718 is turned off via conductor 720. In a similar manner, the guidance control signal is compared in processors 706 and 708. If the signal compares within a predetermined tolerance, the signal is provided from processor 706 to voter 728 via transmitter 724. If the signals do not compare, transmitter 724 is disabled by processor 708 via conductor 726. Voter 728 may be configured to select the signal from (1) transmitter 718, or from (2) transmitter 724 if transmitter 718 is disabled and transmitter 724 is not disabled. The output of voter 728 is transmitted to the respective controller; i.e. speed, braking, steering.

Besides performing comparisons, each processor performs continuous self-checks to verify its operation. As a result of these self-checks and the comparisons, transmitters 718 and 724 in FIG. 6 may be turned off. Alternatively, with processors 702, 704, 706, and 708 operating, there may be two valid output signals transmitted to voter 728. Thus, voter 728 need only determine if a bus signal is being received. If pair 710 is predetermined to act as a master and transmitter 718 is operating, then this signal is passed on. However, if pair 710 is not operating, then a signal from pair 712 may be passed on. Otherwise, no signal is sent to the controller. In this case, voter 728 provides a warning to the crew to terminate guidance and manual commands are used as shown in FIG. 7.

Figure 7:
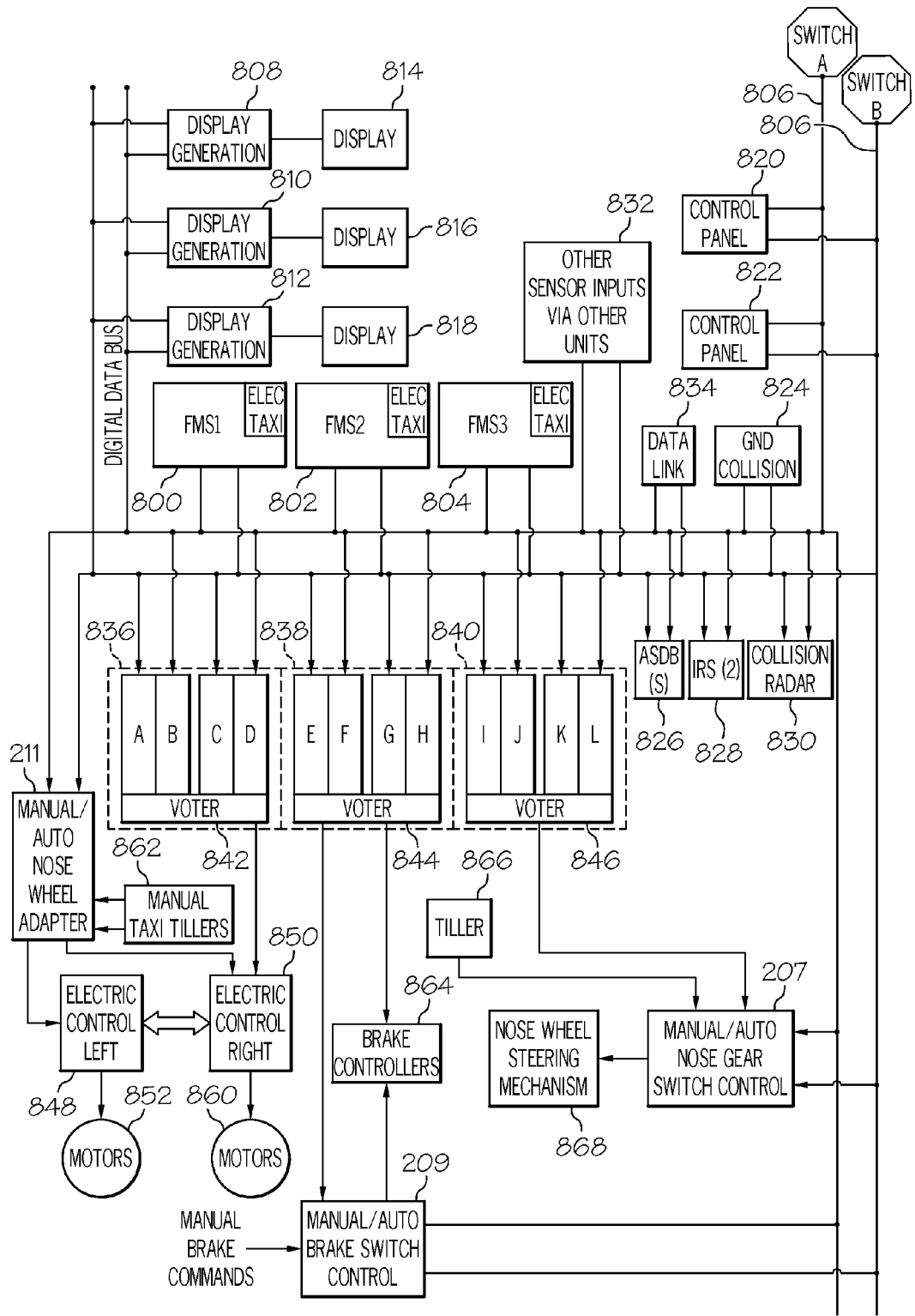
FIG. 7 is a functional block diagram of aircraft system suitable for providing the requisite integrity and availability in accordance with an embodiment.

FIG. 7 is a functional block diagram of an aircraft system that comprises three computational processors. Loss of any one processor still allows proper guidance operation. In some aircraft, three processors already exist; e.g. three flight management systems (FMS). In such cases the existing processors may be further configured for the surface ground taxi functions described herein. For example, FIG. 7 illustrates three processors 800, 802, and 804 each configured for, among other things, taxi guidance control. For simplicity, FIG. 7 is shown using an ARINC 664 data bus structure 806; however, connections among the various units may be accomplished using various methods so long as the requisite integrity and availability is maintained. In this embodiment, first, second, and third display generators 808, 810, and 812 are coupled to bus 806 and each to a respective display system 814, 816, and 818, respectively. Similarly, first and second control panels 820 and 822 are provided and are coupled to bus 806.

A ground collision processor 824 (similar to surveillance and surface alert function 318 in FIG. 3) receives inputs from a plurality (e.g. two each) of ADSB receivers 826, inertial reference systems 828 and collision radar sensors and/or receivers 830. Multiple sensors utilized to provide the required integrity and availability inputs 832 from other units may also be provided to bus 806 and processed as herein described. A data link 834 is provided on bus 806.

Also shown in FIG. 7 are first, second, and third selectors 836, 838, and 840, respectively, of the type shown and described in connection with FIG. 6. That is, selector 836 comprises a first pair of processors A and B, a second pair of processors C and D, and a voter 842 coupled together as shown in FIG. 6. Similarly, selector 838 comprises processors E, F, G, and H and a voter 844. Likewise, selector 840 comprises processors I, J, K, and L and a voter 846. Selector 836 and manual/auto nose wheel adapter 211 (FIG. 2) control the left and right electric taxi controllers 848 and 850, which in turn control motors 852 and 860, respectively. Manual/auto nose wheel adapter 211 is coupled to bus 806 and receives input from manual taxi tillers 862. Selector 838 provides a control input to manual/auto brake switch control 209 (FIG. 2), which in turn is coupled to bus 806. Manual/auto brake switch control 209 is configured to receive manual brake commands. Thus, manual/auto brake switch control 209 and selector 838 control the brake controllers 864. Selector 840 and tiller 866 control the manual/auto nose gear switch 207

(FIG. 2), which is coupled to bus 806. The output of manual/auto nose gear switch 207 is coupled to nose wheel steering mechanism 868.

While the embodiment shown and described in FIG. 7 utilizes six pairs of processors and three voters, it should be appreciated a single, more sophisticated selector may be employed to provide all guidance control signals to the controllers. Also, if a single component fails, the remaining components will continue to perform providing the required integrity and availability, and the crew needs to take no further action since the system will continue to perform.

Typically, current avionics systems tend to be equipped with multiple processing components that are available for other safety reasons (e.g. three flight management systems, three inertial reference systems, etc.). These can be expanded and arranged in a unique manner to provide high integrity and availability guidance signals with little additional hardware, which is especially important in retrofitting existing aircraft.

Figure 8:
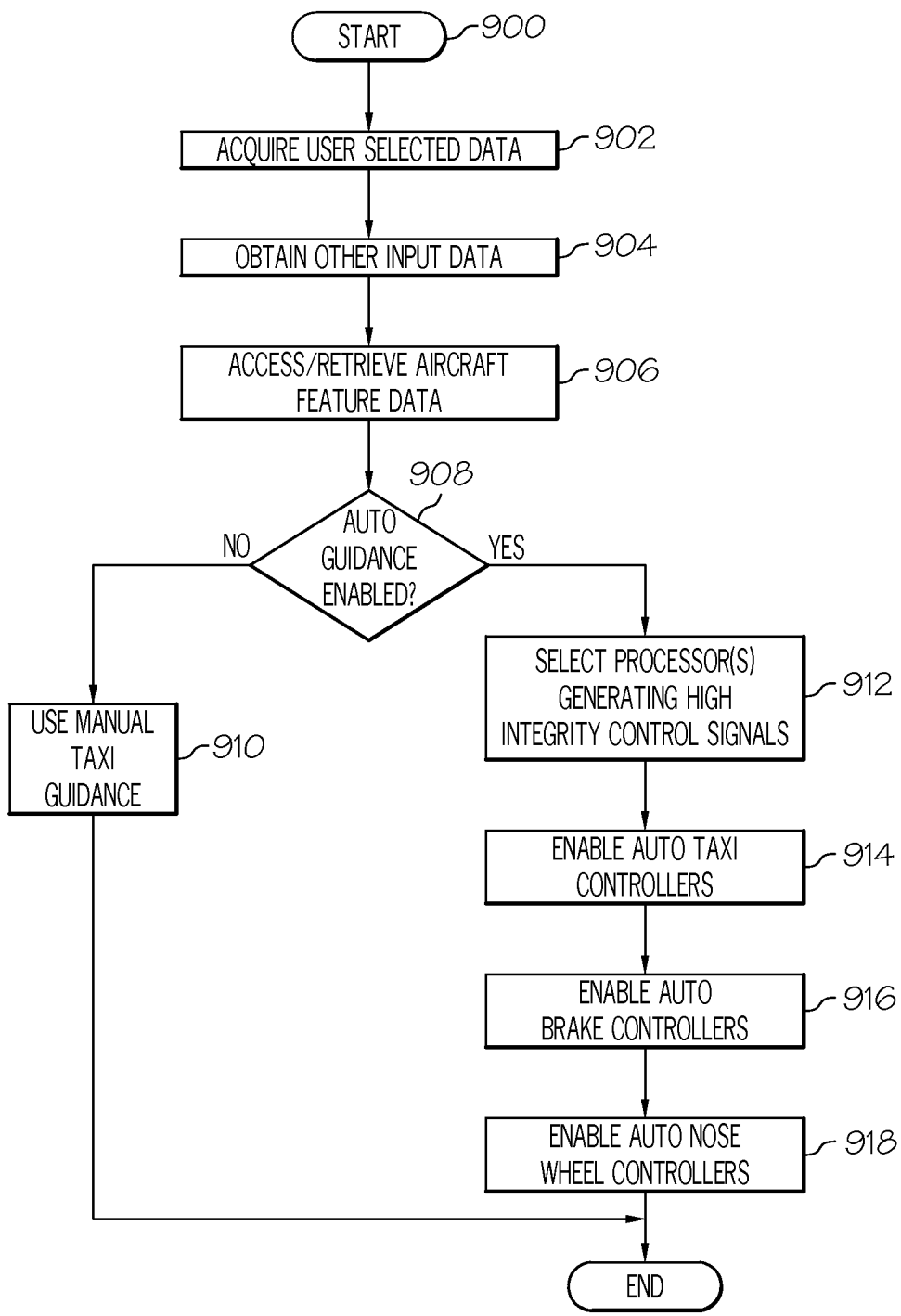
FIG. 8 is a flow-chart illustrating an exemplary embodiment of a high-integrity, high-availability electric taxi auto guidance method in accordance with an embodiment.
Figure 9:
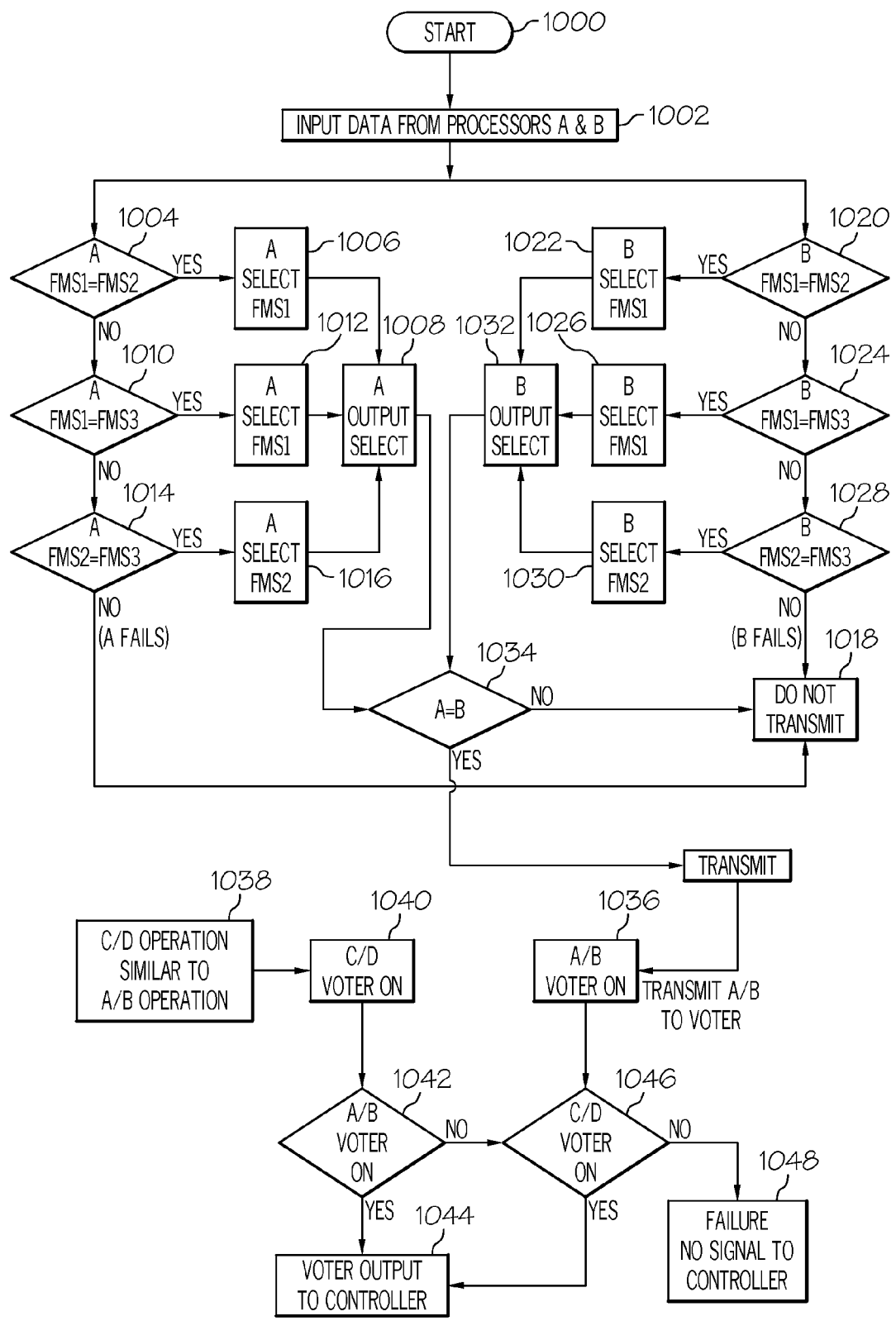
FIG. 9 is a flow-chart of an exemplary auto guidance process for generating high integrity, high availability electric taxi control signals in accordance with an embodiment.

FIGS. 8 and 9 are flow charts that illustrate exemplary embodiments of high-integrity and high-availability electric taxi auto-guidance processes 900 and 1000. These processes may be performed by appropriate systems or components of the host aircraft, such as the taxi guidance system 200 shown in FIG. 2 or flight management system (FMS) shown in FIG. 7. The various tasks performed in connection with processes 900 and 1000 may be performed by software, hardware, firmware, or any combination thereof. For illustrative purposes, the following descriptions of processes 900 and 1000 may refer to elements mentioned above in connection with FIG. 1-7. In practice, portions of processes 900 and 1000 may be performed by different elements of the described system, e.g., the processor architecture 102, the ground management system 202, etc. It should be appreciated that the processes 900 and 1000 may include any number of additional or alternative tasks, the tasks shown in FIGS. 8 and 9 need not be performed in the illustrated order, and the processes 900 and 1000 may be incorporated into a more comprehensive procedure or process having additional functionality not described in detail herein. Moreover, one or more of the tasks shown in FIGS. 8 and 9 could be omitted as long as the intended overall functionality remains intact.

Although the auto-guidance processes 900 and 1000 could be performed or initiated at any time while the host aircraft is operating, this example assumes that the processes 900 and 1000 are performed after the aircraft has landed (or before takeoff). More specifically, the processes 900 and 1000 can be performed while the aircraft is in a taxi mode. The processes 900 and 1000 can be performed in a virtually continuous manner at a relatively high refresh rate. For example, iterations of the processes 900 and 1000 could be performed at a rate of 12-40 Hz (or higher) such that the synthetic flight deck display will be updated in real-time or substantially real time in a dynamic manner.

Referring to FIG. 8, the auto-guidance PROCESS 900 obtains, receives, accesses, and/or acquires certain data and information that influences the generation and presentation of taxi guidance information. In this regard, the process may acquire certain types of user-selected or user-entered data as input data (TASK 902). The user input data may include any of the information specified above with reference to the user input device 234 (FIG. 2). For example, the process 900 may contemplate user-selected or user-identified gates, runways, traffic conditions, or the like. The process 900 may also obtain or receive other input data (TASK 904) that might influence the generation and presentation of taxi guidance information. Referring again to FIG. 2, the various elements, systems, and components that feed the taxi guidance system 200 may provide the other input data for TASK 904. In certain embodiments, this input data includes aircraft status data for the host aircraft (such as geographic position data, heading data, and the like) obtained from onboard sensors and detectors. The input data may also include data received from air traffic control via the data link subsystems 240 (FIG. 2) and 308 (FIG. 3). In some scenarios, the input data also includes neighboring aircraft status data for at least one neighboring aircraft in the airport field, which allows the taxi guidance system 200 to react to airport traffic that might impact the taxi operations of the host aircraft.

The auto-guidance PROCESS 900 accesses or retrieves airport feature data that is associated or otherwise indicative of synthetic graphical representations of the particular airport field (TASK 906). As explained above, the airport feature data might be maintained onboard the aircraft, and the airport feature data corresponds to, represents, or is indicative of certain visible and displayable features of the airport field of interest. The specific airport features data that will be used to render a given synthetic display will depend upon various factors, including the current geographic position and heading data of the aircraft.

If the auto guidance option has not been selected (TASK 908), the crew manually operates the aircraft and follows a best taxi route on a cockpit display with instructions as to how to best navigate the suggested taxi path (TASK 910). That is, the visual taxi system will make suggestions regarding speed, steering, when to turn thrust engines and electric drive taxi motors on and off, etc. If, however, auto guidance has been enabled, ACP 205 will generate an auto-taxi path by generating high integrity taxi auto control signals as will be described hereinafter. Process 900 continues with ACP 205 enabling the right and left electric taxi controllers 610 and 612 (FIG. 4, TASK 914), brake controllers 602 (TASK 916) and the nose wheel auto-steering mechanism 618 (TASK 918).

The electric taxi guidance information may also be updated in an ongoing manner to reflect changes to the operating conditions, traffic conditions, air traffic control instructions, and the like. In practice, PROCESS 900 can be repeated indefinitely and at any practical rate to support continuous and dynamic updating and refreshing of the display in real-time or virtually real-time. Frequent updating of the displays enables the flight crew to obtain and respond to the current operating situation in virtually real-time.

FIG. 9 is a flow chart illustrating a PROCESS 1000 for generating high integrity, high availability electric taxi control signals using a system of the type shown and described in connection with FIG. 7. While the flow chart will describe the method only in connection with selector 836 that includes processors A, B, C, and D for generating high integrity electric taxi motor control signals, it should be understood that the same process is applicable to (1) selector 838 including processors E, F, G, and H for generating high integrity brake control signals and (2) selector 840 including processors I, J, K, and L for generating high integrity nose wheel steering control signals.

Referring to FIG. 9, processors A and B receive electric taxi motor control data from processors A and B (STEP 1002). Processor A is deemed the master; however, this designation is for convenience only. Referring first to processor A, if the data from FMS 1 is the same as that from FMS2 (STEP 1004), FMS1 is selected (STEP 1006) and becomes the A select output (STEP 1008). If FMS1 is not substantially the same as FMS2, but is substantially the same as FMS3 (STEP 1010), FMS1 is again selected (STEP 1012) and becomes the A select output (STEP 1008). If FMS1 is not substantially the same as FMS3 (STEP 1010), but FMS2 is substantially the same as FMS3 (STEP 1014), FMS2 is selected (STEP 1016) and becomes the A select output (STEP1008). Data from FMS2 is chosen in accordance with a predetermined scheme of priority. FMS3 could have also been chosen. If FMS2 is not substantially the same as FMS3 (i.e. A fails), the data is not transmitted (STEP 1018).

In a similar manner, FMS1, FMS2, and FMS3 are analyzed in STEPS 1020, 1022, 1024, 1026, 1028, and 1032. Once again, if none of the criteria is met, the data is not transmitted (STEP 1018). If, however, one of the criteria is met and a B output select is determined (STEP 1032), the A output select (STEP 1008) and the B output select (STEP 1032) are compared (STEP 1034). If they do not compare, the data is not transmitted (STEP 1018). If however they do compare, the transmitter is turned on (STEP 1035), and the A and B output data is transmitted to a voter (STEP 1036).

A similar process is carried out on data from FMS1, FMS2, and FMS3 supplied to processors C and D (STEPS 1038 and 1040). If the C/D voter is ON and the A/B voter is ON (STEP 1042), the voter output data is sent to the taxi controllers (STEP 1044). If both of the A/B voter (STEP 1042) and the C/D voter (STEP 1046) are OFF, no data is sent to the electric taxi controllers (STEP 1048), and the crew will get a warning and take manual control via the tillers as shown and described in connection with FIG. 7).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A high-integrity auto-guidance and control method for use in conjunction with an aircraft electric taxi drive system, comprising:
   receiving taxi path data in first and second pairs of parallel processors, the first pair comprising first and second processors and the second pair comprising third and fourth processors;
   generating in each of the processors taxi path guidance and control information from the taxi path data;
   selecting, in accordance with a predetermined priority scheme, taxi path guidance and control information from the first and second pairs of processors and from the third and fourth pairs of processors; and
   sending commands derived from the taxi path guidance and control information from the first and second pairs of processors and the third and fourth pairs of processors to at least one electric taxi controller.

2. The high-integrity auto-guidance and control method according to claim 1 wherein the taxi path guidance and control information includes at least taxi speed guidance information.

3. The high-integrity auto-guidance and control method according to claim 1 wherein the taxi path guidance and control information includes at least taxi direction information and further comprising applying steering commands derived from the taxi direction information by the processor to a nose wheel steering mechanism to steer the aircraft.

4. The high-integrity auto-guidance and control method according to claim 1 wherein the taxi path guidance and control information includes at least braking information and further comprising applying braking commands derived from the braking information by the processor to electric taxi brake controllers.

5. The high-integrity auto-guidance and control method according to claim 1 wherein the taxi path guidance and control information comprises taxi speed guidance information, taxi direction information, and braking information.

6. The high-integrity auto-guidance and control method according to claim 1, further comprising comparing the taxi path guidance information in the first and second processors and in the second and third processors.

7. The high-integrity auto-guidance and control method according to claim 6 further comprising providing taxi path guidance and control information to the controller if the data compares in at least one of the first and second pairs.

8. The high-integrity guidance and control system according to claim 1, further comprising a selector for comparing taxi path guidance and control information generated in each of the first and second pairs of processors.

9. The high-integrity guidance and control system according to claim 8 further comprising a voter for selecting taxi path guidance and control information from the first and second and the third and fourth processor in accordance with a predetermined priority scheme.

10. A high-integrity guidance and control system for use on-board an aircraft equipped with an electric taxi mechanism, the system comprising:
    a first source of taxi path guidance data;
    an electric taxi controller; and
    a first and second pair of processors for receiving taxi path guidance information, the first pair comprising first and second processors and the second pair comprising third and fourth processors, each processor coupled to the first source and to the electric taxi controller, and each processor configured to (1) generate taxi path guidance and control information from taxi path guidance data, and (2) send commands derived from the taxi path guidance control information in one of the processors based on a predetermined priority scheme to the electric taxi controller if the taxi path guidance data in a first processors substantially compares to the taxi path guidance data in a second processors.

11. A high-integrity auto-guidance and control method for use in conjunction with an aircraft having a first plurality of processors onboard and equipped with an electric taxi drive system, comprising:
    obtaining aircraft status data;
    accessing airport feature data;
    receiving from each of the first plurality of processors taxi path guidance and control data;
    comparing the taxi path guidance and control data in a second of plurality of processors;
    selecting taxi path guidance and control data from one of the second plurality of processors in accordance with a predetermined scheme of priority; and
    sending commands derived from the selected guidance and control data to the electric taxi drive system.

12. The high-integrity auto-guidance and control method of claim 11 wherein the step of receiving comprises receiving taxi path guidance and control data from three processors.

13. The high-integrity auto-guidance and control method of claim 12 wherein the three processors are three separate flight management system processors.

14. The high-integrity auto-guidance and control method of claim 12 wherein the three processors are three distinct inertial reference system processors.

15. The high-integrity auto-guidance and control method of claim 12 wherein the step of selecting comprises:
comparing the data from the three processors in first and second pairs of selector processors, the first pair comprising first and second processors and the second pair comprising third and fourth processors; and
providing taxi path guidance and control information if the data substantially compares in the first pair and in the second pair of selector processors.

16. The high-integrity auto-guidance and control method of claim 15 wherein the taxi path guidance and control information is taxi speed guidance information.

17. The high-integrity auto-guidance and control method of claim 16 wherein the step of selecting further comprises:
comparing brake control data from the three processors in third and fourth pairs of selector processors the third pair comprising fifth and sixth processors and the fourth pair comprising seventh and eight processors; and
providing brake control information if the brake control data substantially compares in the third pair of selector processors and in the fourth pair of selector processors.

18. The high-integrity auto-guidance and control method of claim 17 wherein the step of selecting further comprises:
comparing nose wheel steering data from the three processors is fifth and sixth pairs of selector processors, the fifth pair comprising ninth and tenth processors and the sixth pair comprising eleventh and twelfth processors; and
providing nose wheel steering control information if the nose wheel steering data substantially compares in the fifth pair of selector processors and in the sixth pair of selector processors.

\* \* \* \* \*